(12) United States Patent
Khan et al.

(10) Patent No.: US 9,399,599 B1
(45) Date of Patent: Jul. 26, 2016

(54) STRAIN-HARDENING CEMENTITIOUS COMPOSITE

(71) Applicants: Mohammad Iqbal Khan, Riyadh (SA); Galal Fares, Riyadh (SA); Shehab Eldin Mohamed Mourad, Riyadh (SA); Wasim Abbass, Riyadh (SA)

(72) Inventors: Mohammad Iqbal Khan, Riyadh (SA); Galal Fares, Riyadh (SA); Shehab Eldin Mohamed Mourad, Riyadh (SA); Wasim Abbass, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/872,733

(22) Filed: Oct. 1, 2015

(51) Int. Cl.
*C04B 14/06* (2006.01)
*C04B 16/06* (2006.01)
*C04B 28/02* (2006.01)

(52) U.S. Cl.
CPC ............ *C04B 14/068* (2013.01); *C04B 16/0641* (2013.01); *C04B 28/021* (2013.01)

(58) Field of Classification Search
CPC .. C04B 14/068; C04B 16/0641; C04B 28/021
See application file for complete search history.

(56) References Cited

U.S. PATENT DOCUMENTS

| 5,030,282 A | 7/1991 | Matsuhashi et al. |
| 6,528,151 B1 | 3/2003 | Shah et al. |
| 6,610,224 B2 * | 8/2003 | Sullivan ............... B28B 1/16 106/737 |
| 2007/0181040 A1 * | 8/2007 | Li .......................... C04B 28/02 106/708 |
| 2013/0012625 A1 | 1/2013 | Li et al. |
| 2013/0281556 A1 * | 10/2013 | Ong ....................... C04B 28/02 521/59 |
| 2014/0097557 A1 * | 4/2014 | Alhozaimy ............ C04B 28/04 264/333 |
| 2014/0191436 A1 | 7/2014 | Chastain et al. |

OTHER PUBLICATIONS

Magalhães et al., "*Influence of Local Raw Materials on the Mechanical Behavior and Fracture Process of PVA-SHCC ,*" Materials Research, 17(1), pp. 146-156, 2014.

* cited by examiner

*Primary Examiner* — Robert Jones, Jr.
(74) *Attorney, Agent, or Firm* — Richard C. Litman

(57) ABSTRACT

A strain-hardening cementitious composite (SHCC) can include cement, fly ash (FA), dune sand (DS), and polyvinyl alcohol (PVA) fibers. The amount of DS in the SHCC can be at least 25% by weight. The cement can be Type I ordinary Portland cement, conforming to ASTM C150 specifications. The fly ash can be Class F fly ash (FA). The median particle size of the cement can be 14 μm. The median particle size of the FA can be 10 μm.

9 Claims, 5 Drawing Sheets

STRAIN-HARDENING CEMENTITIOUS COMPOSITE

BACKGROUND OF THE INVENTION

1. Field of the Invention

The present invention generally relates to cementitious composites, and particularly to a strain-hardening cementitious composite having early strain properties.

The present invention was funded by the National Plan for Science, Technology and Innovation (MAARIFAH), King Abdulaziz City for Science and Technology, Kingdom of Saudi Arabia, Award Number 12-ADV2591-02.

2. Description of the Related Art

Strain hardening cementitious composites (SHCC) exhibit extremely ductile behavior under tensile loads as well as strain hardening. For example, SHCCs can have a significantly higher strain capacity than the strain capacity of conventional concrete. As such, SHCCs have potentially wide-ranging applications in the construction industry. Unfortunately, SHCCs can be costly to produce particularly in areas of the world in which components of SHCCs are not locally attainable. Thus, it is desirable to utilize local materials in the production of SHCC to reduce, if not eliminate, costs related to importing such materials.

Thus, a strain-hardening cementitious composite having early strain properties solving the aforementioned problem is desired.

SUMMARY OF THE INVENTION

A strain-hardening cementitious composite (SHCC) can include cement, fly ash, dune sand, and polyvinyl alcohol microfibers (PVA microfibers). The SHCC includes an increased amount of dune sand relative to other strain hardening cementitious composites. For example, the amount of dune sand in the SHCC can be at least 25% by weight of the composite. The SHCC can also include a super absorbent polymer, a viscosity modifying agent, and a polycarboxylic ether superplasticizer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A strain-hardening cementitious composite (SHCC) can include cement, fly ash (FA), dune sand (DS), and polyvinyl alcohol microfibers (PVA microfibers). The amount of dune sand (DS) in the SHCC can be at least 25% by weight. For example, the amount of dune sand (DS) in the SHCC can be about 25% by weight or about 30% by weight. The cement can be Type I ordinary Portland cement, conforming to ASTM C150 specifications. The fly ash can be Class F fly ash (FA). The median particle size of the cement can be 14 μm. The median particle size of the FA can be 10 μm.

Figure 1A:
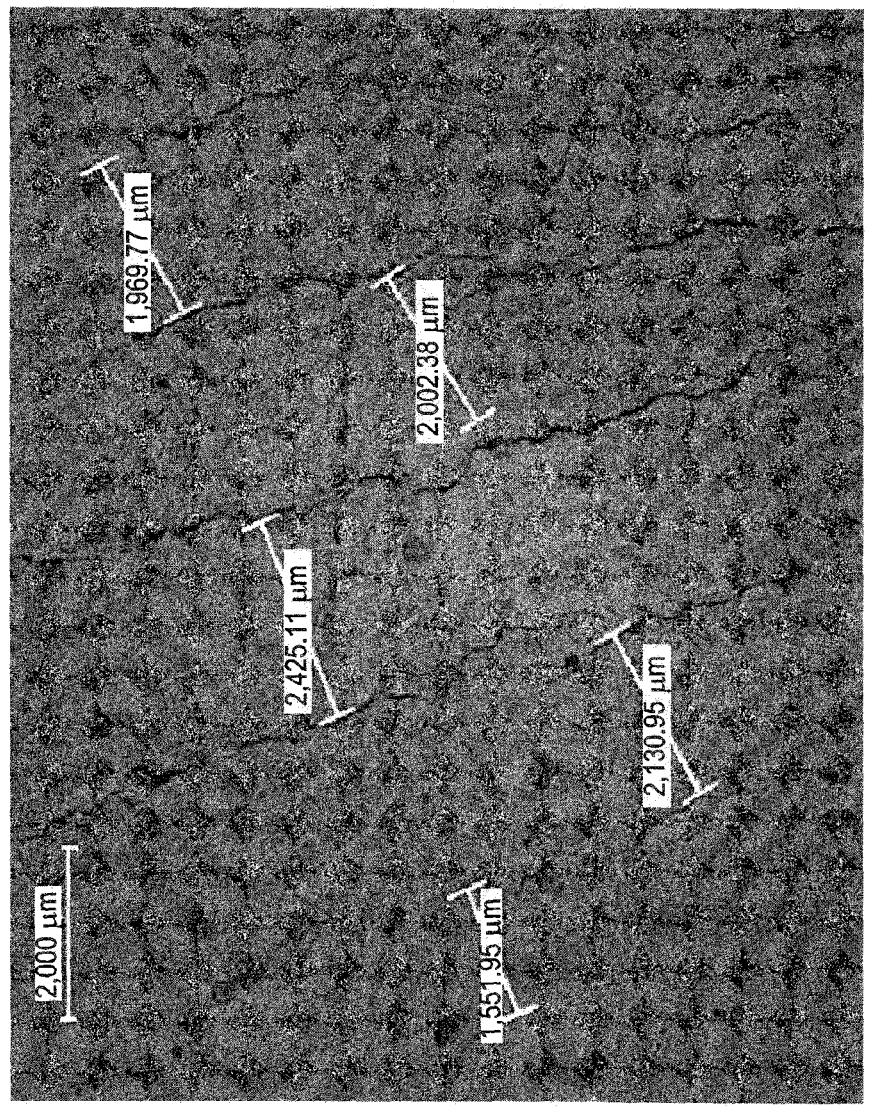
FIG. 1A is a photomicrograph of a tested sample S1 according to the present invention, using a stereomicroscope.
Figure 1B:
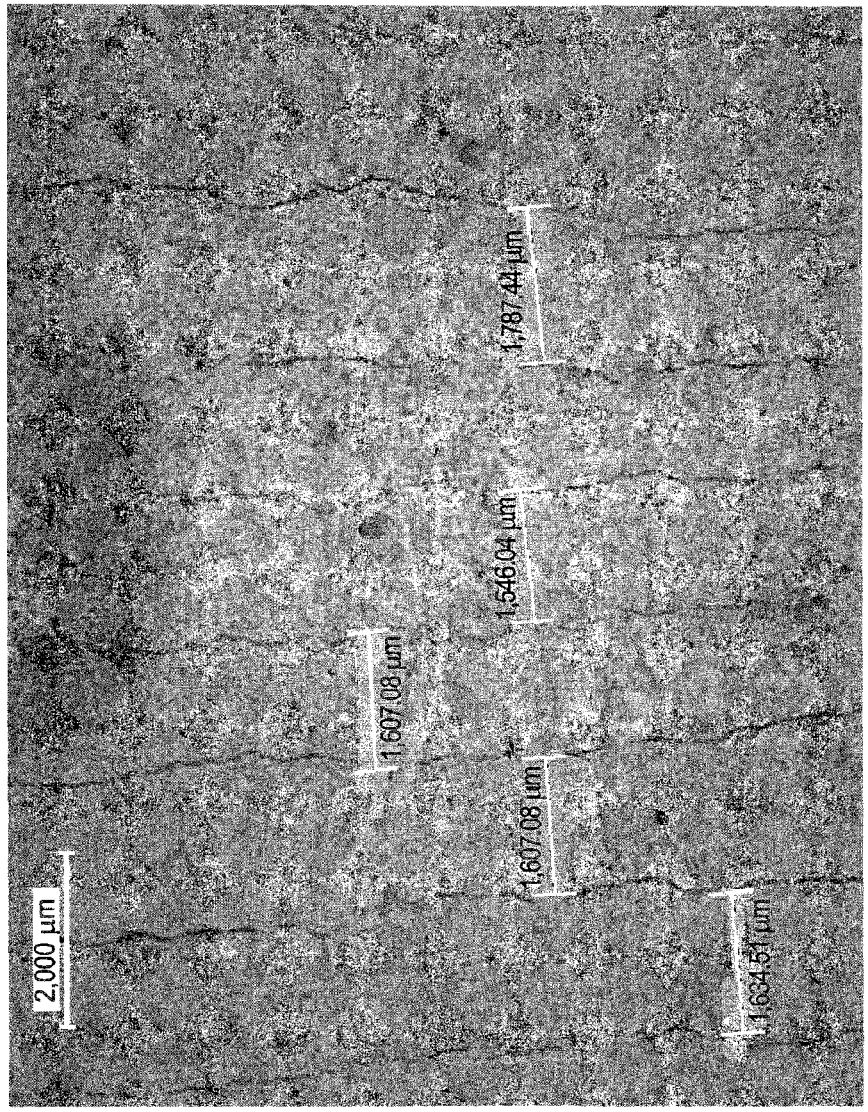
FIG. 1B is a photomicrograph of a tested sample S2 according to the present invention, using a stereomicroscope.

The SHCC can also include a super absorbent polymer (SAP), a viscosity modifying agent (VMA), and a polycarboxylic ether superplasticizer (PE), such as a PE based high range water reducing admixture. An amount of potable water can be used in the preparation of the SHCC. The SAP can include a mixture of chemically cross-linked copolymers of acrylic acid and acryl amide. The SAP can induce weakness in the matrix, such as for multiple cracking, as illustrated in FIGS. 1A-1B, and can act as a curing agent for further hydration to reduce autogenous shrinkage in the mixture. The dosage of SAP should be optimized based on the source and the type of cement being used. Further, different amounts of the VMA can be added to the SHCC to adjust the viscosity of the SHCC Table 1 provides the physical properties and chemical composition (% by weight) of the Portland cement and fly ash that can be utilized to produce the SHCC.

TABLE 1

| Oxide Composition (% by weight) | Portland Cement | Fly Ash |
| --- | --- | --- |
| $SiO_2$ | 20.2 | 50 |
| $Al_2O_3$ | 5.49 | 28 |
| $Fe_2O_3$ | 4.12 | 10.4 |
| CaO | 65.43 | <6 |
| MgO | 0.71 | <4 |
| $Na_2Oeq$ | 0.26 | 1.5 |
| $SO_3$ | 2.61 | <2.5 |
| Loss on ignition (%) | 1.38 | 4 |
| Specific gravity | 3.14 | 2.3 |
| Fineness ($m^2$/kg) | 373 | 300–600 |

Figure 2:
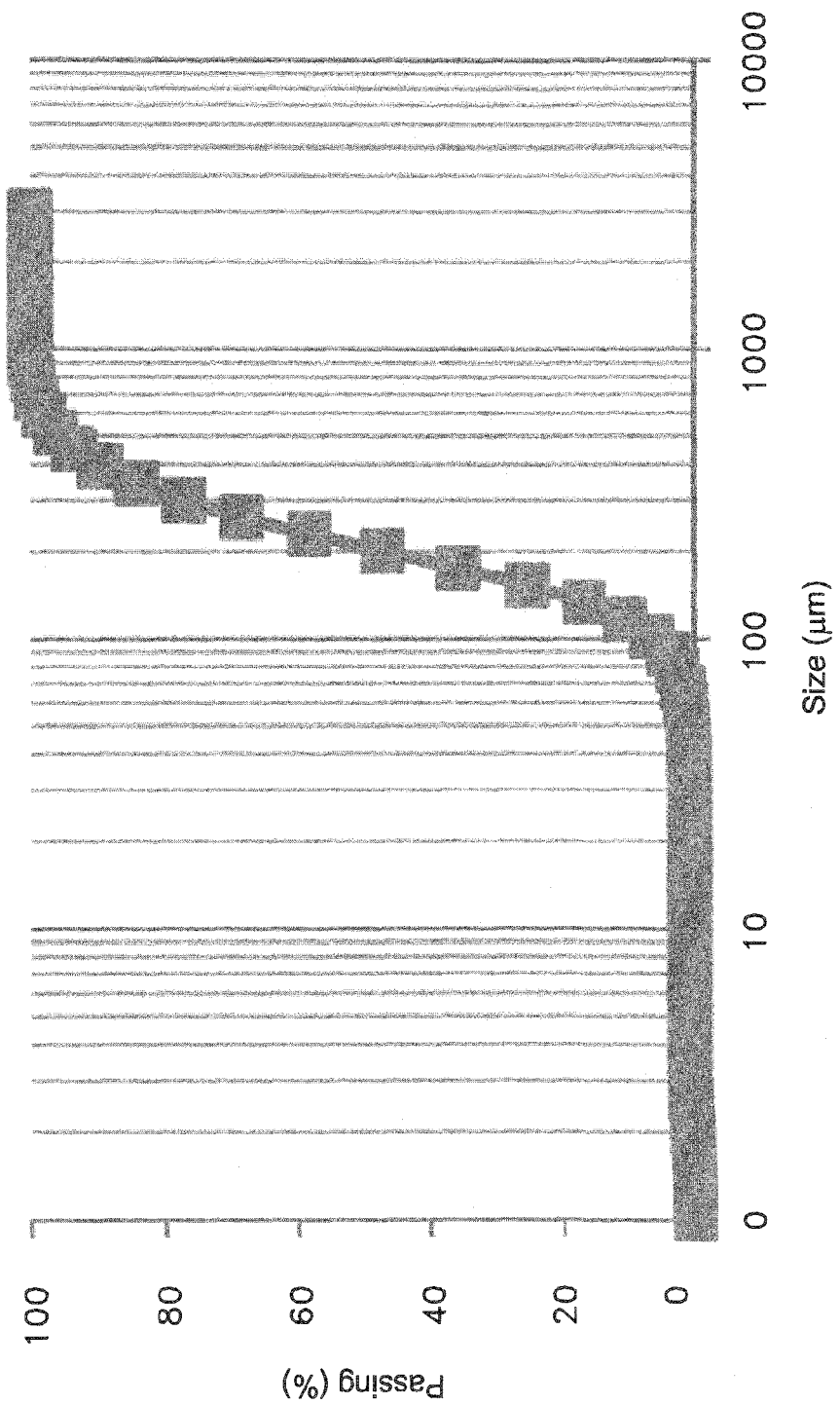
FIG. 2 is a graph illustrating particle size distribution of dune sand utilized in a strain hardening cementitious composite, according to the present invention.

The dune sand (DS) can be any type of dune sand (DS) suitable for producing high quality SHCC. For example, the DS can include between 80% to 90% quartz by weight and between 10% to 20% feldspar by weight. The particle size of the DS can be any suitable size. Exemplary particle size distributions of DS are illustrated in FIG. 2, the median size being 200 μm. The dune sand can be obtained from the Arabian Peninsula. The Arabian Peninsula contains one of the largest deserts in the world and represents an ideal source of high quality quartz sand, particularly for the Arabian Gulf regions. Using local dune sand can reduce, such as significantly reduce, the cost of SHCC.

The PVA microfibers used to produce the SHCC can be any suitable type of PVA microfiber that can affect the strain hardening behavior of the SHCC. Table 2 provides exemplary properties of the PVA microfibers.

TABLE 2

| Sample No. | Length (mm) | Diameter (micron) | Density (g/$cm^3$) | Tensile Strength (MPa) | Young's Modulus (GPa) | Elongation (%) |
| --- | --- | --- | --- | --- | --- | --- |
| 1 | 12 | 40 | 1.3 | 1600 | 42.8 | 6 |

The SHCC can be made by mixing cement, fly ash, and dune sand together to provide a first pre-homogenized mixture, adding water premixed with VMA and super plasticizer to the mixture to form a second mixture, adding PVA microfibers to the second mixture to form a final mixture, and casting the final mixture into a mold. Table 3 provides the composition of an exemplary strain hardening cementitious composite according to the present teachings.

TABLE 3

| Materials | Amount (approx. % by weight) |
| --- | --- |
| Cement | 24.0 |
| Fly Ash (FA) | 30.0 |
| Dune Sand (DS) | 25.0 |
| Polyvinyl Alcohol (PVA) microfiber s | 1.4 |
| Super Absorbent Polymer (SAP) | 0.1 |
| Viscosity Modifying Agent (VMA) | 0.15 |
| Polycarboxylic Ether Superplasticizer (PE) | 0.1 |
| Water | 19.0 |

The following examples illustrate the present teachings.

EXAMPLE 1

Sample Preparation

About 475.8 kg/m$^3$ Portland Cement, about 582 kg/m$^3$ fly ash, and about 486.5 kg/m$^3$ dune sand was mixed in a stainless steel bowl with a Hobart HL-300 (30 Qt.) mixer having a "B" flat beater, for approximately one minute at speed #1, to achieve a homogenized mixture. Subsequently, a predetermined amount of potable water, such as about 370.2 kg/m$^3$ (premixed with about 3 kg/m$^3$ VMA and about 2.2 kg/m$^3$ polycarboxylic ether superplasticizer) was mixed with the homogenized mixture at the initial speed for approximately one minute. For approximately the next two minutes, the homogenized mixture and the potable water was mixed at speed #2. The mixer was then stopped for approximately thirty seconds to inspect the homogenized mixture and clean the walls of the bowl.

After the homogenized mixture was checked and the walls cleaned, the mixer was restarted for approximately one and a half minutes to incorporate about 27 kg/m$^3$ PVA microfibers into the homogenized mixture. The homogenized mixture having the PVA microfibers was mixed slowly to achieve a homogenized mixture having well dispersed microfibers. The speed of the mixer was increased from speed #2 to speed #3 and maintained for four minutes. After four minutes, the mixture was checked for uniform PVA microfiber dispersion, and the speed of the mixer was increased to speed #4, until a uniform mixture was obtained. The final mixture was then cast into a mold by placing different layers over each other, followed by finishing the surface. After approximately twenty four hours of casting, sample(s) were demolded and wrapped with plastic bags and stored at normal temperature, such as about 20° C.±2° C., for approximately seven days to be tested for direct tensile strength at ambient temperature.

EXAMPLE 2

Tensile Strength Testing

Figure 3:
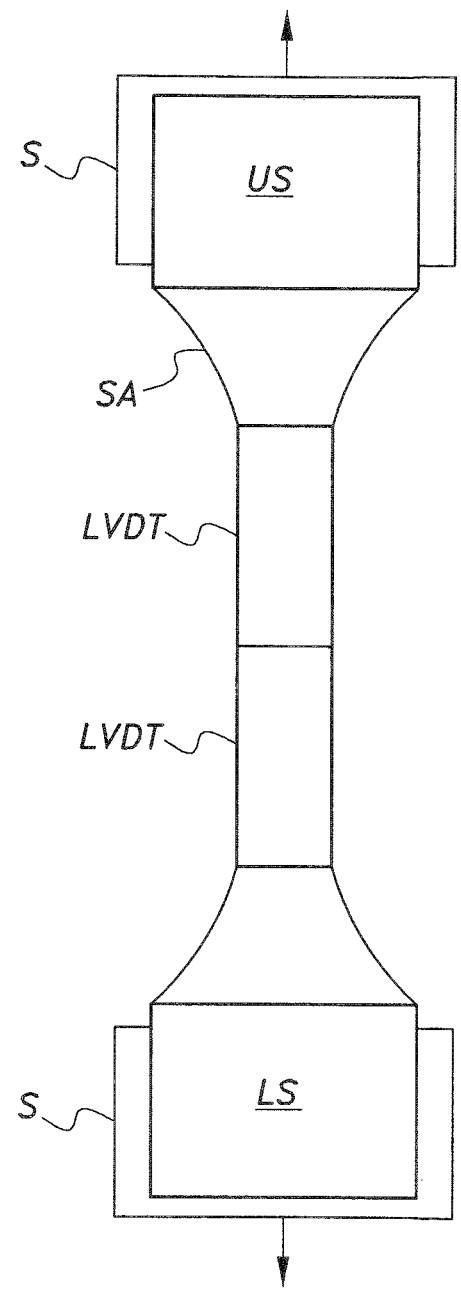
FIG. 3 is an illustration of a tensile loading setup with a dumbbell shaped sample of a strain hardening cementitious composite, according to the present invention.
Figure 4:
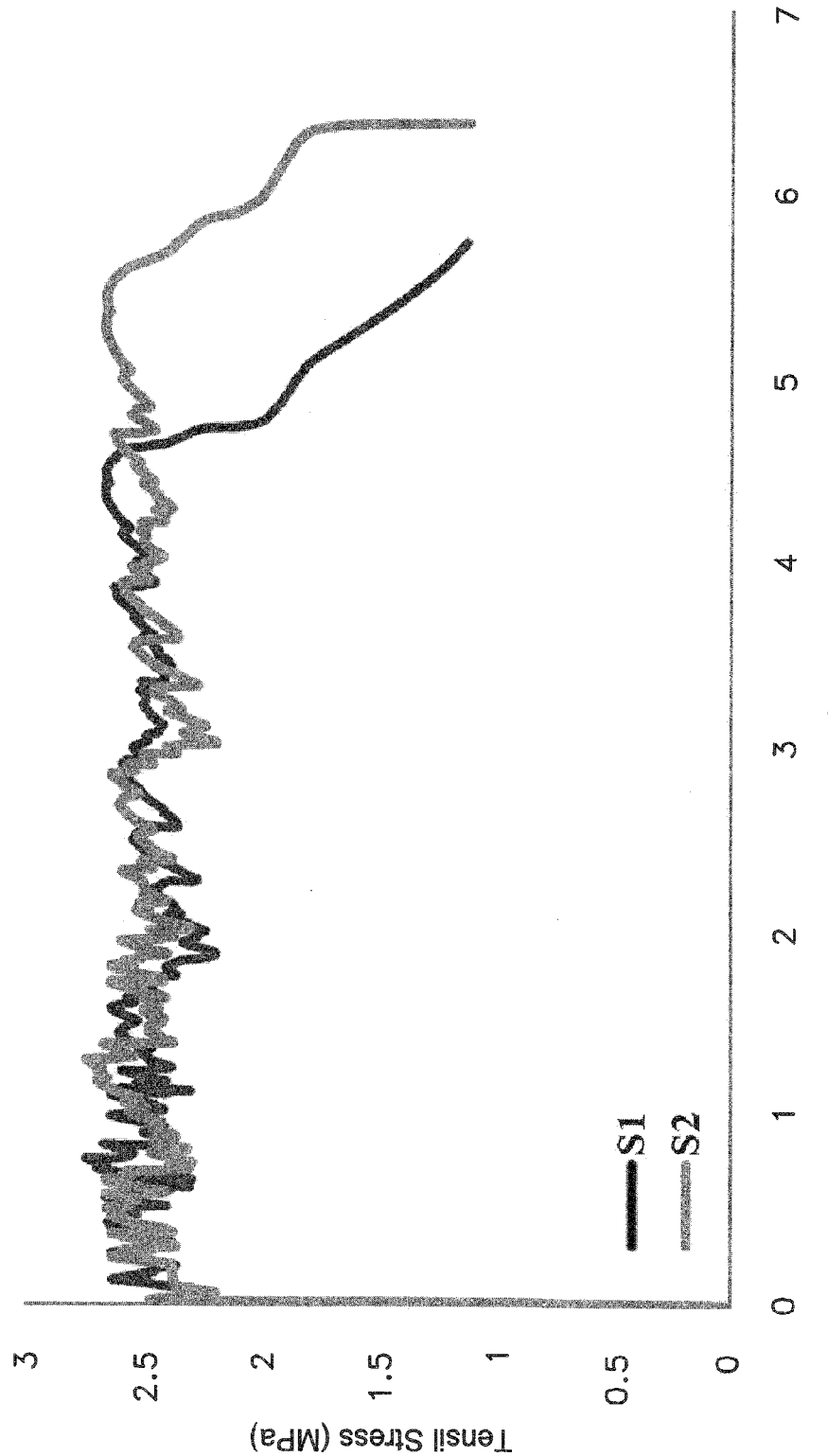
FIG. 4 is a graph illustrating tensile properties of strain hardening cementitious composite samples according to the present invention.

The tensile strength of the sample(s) were obtained by using a 30 kN capacity machine. Tests were performed after seven days of curing using a monotonic displacement control device having a loading rate of 0.15 mm/min. As set forth above, for testing purposes, the SHCC mixture was cast and cured into dumbbell-shaped samples, with each sample SA having an upper side US and a lower side LS, as shown in FIG. 3. Each sample SA was gripped from the sides, by a serrated surface S, and pulled in opposite directions, as illustrated by the arrows in FIG. 3. Two Linear Variable Differential Transformers LVDT were mounted onto the middle portion of the sample SA to measure the elongation of the sample SA resulting from the applied tensile loading. An additional extensometer was also fixed onto the sample SA to get a percentage of elongation under direct tensile loading. The results from the tensile strength test, illustrated in FIG. 4, confirm an extended tensile strain capacity of more than 5%. Further, as shown in FIGS. 1A and 1B, both samples, S1 and S2, exhibited tight crack widths of less than 60 μm. For example, S1 had crack widths ranging from about 1,551.95 μm to about 2,425.11 μm. S2 had steady inter-crack spacing ranging from about 1,546.04 μm to about 1,787.44 μm.

It is to be understood that the present invention is not limited to the embodiments described above, but encompasses any and all embodiments within the scope of the following claims.

We claim:

1. A strain-hardening cementitious composite, comprising:
   cement;
   fly ash;
   dune sand, wherein the dune sand comprises between 80% to 90% quartz, between 10% and 20% feldspar and a median particle size of 200 μm; and
   polyvinyl alcohol fibers;
   wherein the strain-hardening cementitious composite includes at least 25% by weight dune sand.

2. The strain-hardening cementitious composite according to claim 1, further comprising:
   a super absorbent polymer;
   a viscosity modifying agent; and
   a polycarboxylic ether superplasticizer.

3. The strain-hardening cementitious composite according to claim 1, wherein the cement comprises Portland cement.

4. The strain-hardening cementitious composite according to claim 1, wherein the cement comprises a median particle size of 14 μm.

5. The strain-hardening cementitious composite according to claim 1, wherein the fly ash comprises a median particle size of 10 μm.

6. The strain-hardening cementitious composite according to claim 1, wherein the polycarboxylic ether superplasticizer comprises a polycarboxylic ether superplasticizer based high range water reducing admixture.

7. A strain-hardening cementitious composite comprising:
   from about 22% to about 28% by weight cement;
   from about 28% to about 35% by weight fly ash;
   from about 25% to about 30% by weight dune sand, wherein the dune sand comprises between 80% to 90% quartz, between 10% and 20% feldspar and a median particle size of 200 μm;
   from about 1.0% to about 1.5% by weight polyvinyl alcohol microfibers;
   from about 0.1% to about 0.2% by weight super absorbent polymer;
   from about 0.1% to about 0.2% by weight viscosity modifying agent;
   from about 0.1% to about 0.4% by weight polycarboxylic ether superplasticizer; and
   from about 15% to about 20% by weight potable water.

8. A method of making a strain-hardening cementitious composite, comprising the steps of:
   mixing cement, fly ash, and dune sand to produce a homogenized mixture, wherein the dune sand comprises between 80% to 90% quartz, between 10% and 20% feldspar and a median particle size of 200 μm;

mixing the homogenized mixture with potable water having a viscosity modifying agent and a super absorbent polymer to produce a second mixture;

mixing the second mixture with polyvinyl alcohol fibers to produce a final mixture; and casting the final mixture into a mold.

9. The method of making a strain-hardening cementitious composite according to claim 8, wherein the strain-hardening cementitious composite comprises about 25% by weight dune sand.

\* \* \* \* \*